(12) United States Patent
Fujita

(10) Patent No.: US 10,367,961 B2
(45) Date of Patent: Jul. 30, 2019

(54) IMAGE FORMING APPARATUS, MEMORY MANAGEMENT METHOD, AND MEMORY MANAGEMENT PROGRAM

(71) Applicant: Konica Minolta, Inc., Chiyoda-ku, Tokyo (JP)

(72) Inventor: Yuji Fujita, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/877,964

(22) Filed: Jan. 23, 2018

(65) Prior Publication Data

US 2018/0241890 A1 Aug. 23, 2018

(30) Foreign Application Priority Data

Feb. 23, 2017 (JP) .................. 2017-032414

(51) Int. Cl.
*G06F 15/00* (2006.01)
*H04N 1/00* (2006.01)
*G06F 12/14* (2006.01)
*G06F 12/0875* (2016.01)

(52) U.S. Cl.
CPC ........ *H04N 1/0092* (2013.01); *G06F 12/0875* (2013.01); *G06F 12/1466* (2013.01); *H04N 1/0097* (2013.01); *H04N 1/00832* (2013.01); *G06F 2212/1052* (2013.01); *G06F 2212/455* (2013.01); *H04N 2201/0094* (2013.01)

(58) Field of Classification Search
CPC ............. H04N 1/0092; H04N 1/00832; H04N 1/0097; H04N 2201/0094; G06F 2212/455; G06F 12/1466; G06F 2201/0094; G06F 12/0875
USPC ........................................ 358/1.16
See application file for complete search history.

(56) References Cited

U.S. PATENT DOCUMENTS

2008/0052342 A1* 2/2008 Koga ................. H04N 1/00347
 709/201
2013/0088755 A1* 4/2013 Kim ....................... G03G 15/50
 358/1.16

FOREIGN PATENT DOCUMENTS

JP 2000-250518 A 9/2000

* cited by examiner

*Primary Examiner* — Saeid Ebrahimi Dehkordy
(74) *Attorney, Agent, or Firm* — Buchanan Ingersoll & Rooney PC

(57) ABSTRACT

An image forming apparatus includes: a storage that stores a plurality of control programs of the image forming apparatus; a cache memory; and a hardware processor that controls the image forming apparatus, wherein the hardware processor: writes, to the cache memory, a control program that is an execution candidate selected from among the plurality of control programs; determines execution priorities of the respective control programs that are the execution candidates; and locks down, as an object to be locked down, a control program, the priority of which is relatively high among the control programs that are the execution candidates, in the cache memory.

15 Claims, 10 Drawing Sheets

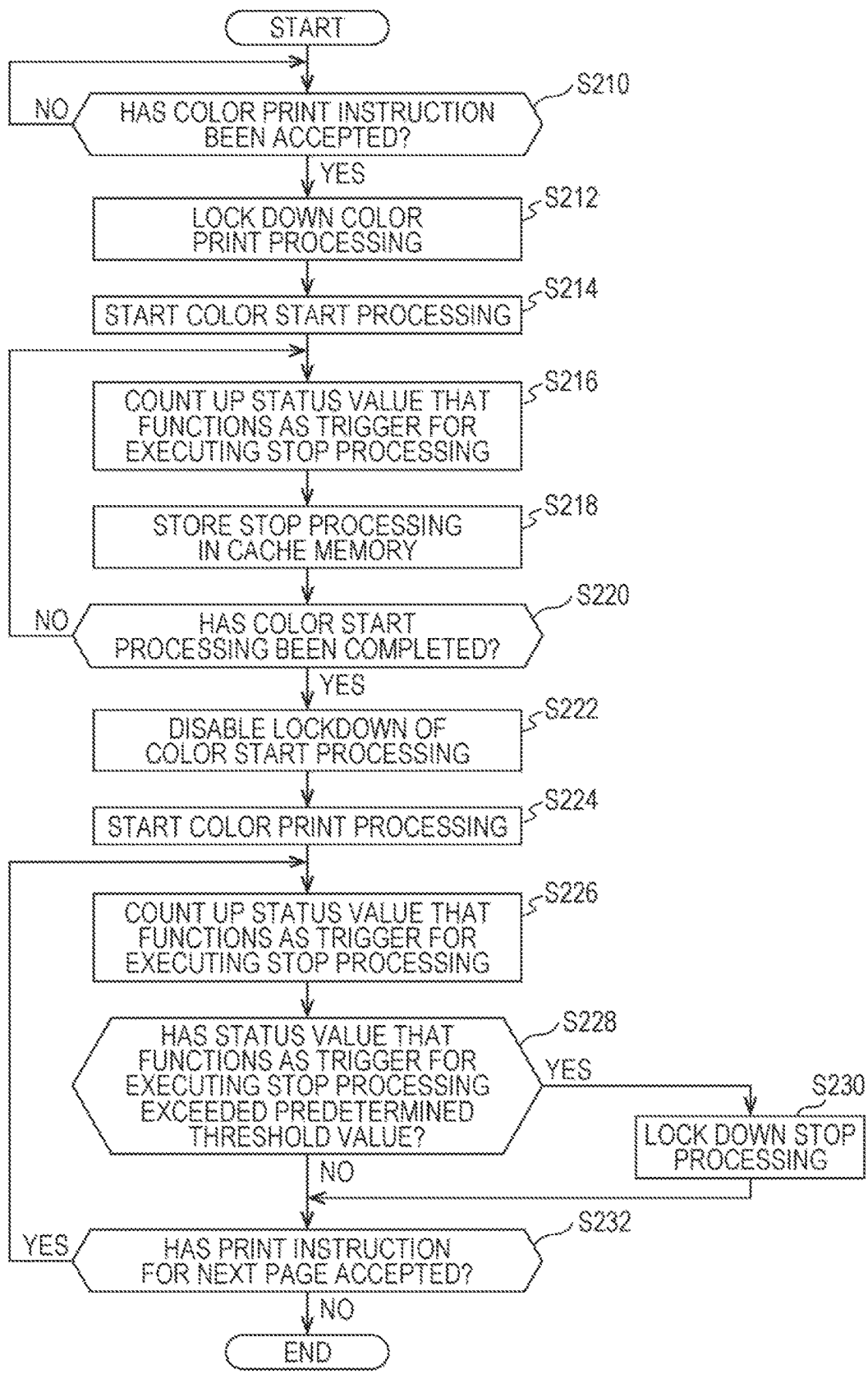

IMAGE FORMING APPARATUS, MEMORY MANAGEMENT METHOD, AND MEMORY MANAGEMENT PROGRAM

The entire disclosure of Japanese patent Application No. 2017-032414, filed on Feb. 23, 2017, is incorporated herein by reference in its entirety.

BACKGROUND

Technological Field

The present disclosure relates to a technique for controlling a lockdown of a cache memory.

Description of the Related Art

Processing executed by an image forming apparatus includes mechanical-control processing, and best-effort type processing (hereinafter also referred to as "best-effort processing"). The mechanical-control processing is processing for controlling each device in the image forming apparatus, and processing that requires real-time performance. The best-effort processing does not require the real-time performance to such an extent that the mechanical-control processing requires the real-time performance. However, the best-effort processing requires usability.

Conventionally, an image forming apparatus executes mechanical-control processing and best-effort processing by separate Central Processing Units (CPUs). In contrast to this, in recent years, an image forming apparatus that executes mechanical-control processing and best-effort processing by sharing a CPU is achieving widespread use. In this case, a control program for the mechanical-control processing and a control program for the best-effort processing share a cache memory.

As a technique related to cache memories, JP 2000-250518 A discloses a character processing device "that is capable of processing high-quality character data at high speed without causing the storage capacity to be increased". By initialization processing, the character processing device saves character codes and frequently used font data in a cache area allocated in a Random Access Memory (RAM), thereby speeding up these data accesses.

When a control program for the mechanical-control processing and a control program for the best-effort processing share a cache memory, there occurs a possibility that the cache memory will be occupied, by one control program. In this case, the image forming apparatus cannot store the other control program in the cache memory, and consequently the processing time of the other control program becomes longer than intended. For the purpose of preventing the above, there is a technique called "cache lockdown". The cache lockdown is a technique for locking the contents of a cache memory so as to prevent a control program written to the cache memory from being overwritten by the other control program. Conventionally, the image forming apparatus stores a control program for executing a series of processing in a cache memory, and then locks down the whole cache memory.

If the whole cache memory is locked down, the lockdown is not disabled until the execution of the control program to be locked down is completed. Therefore, in a case where a new control program is required to be locked down, the image forming apparatus cannot lock down the new control program. As the result, there is a possibility that the processing time of the new control program will become longer than intended. Therefore, an image forming apparatus that is capable of preventing the execution of a control program having a high priority from delaying is desired.

SUMMARY

The present disclosure has been made in order to solve the above-described problems. An object according to an aspect of the present disclosure is to provide an image forming apparatus that is capable of preventing the execution of a control program having a high priority from being delayed. An object according to another aspect of the present disclosure is to provide a memory management method that is capable of preventing the execution of a control program having a high priority from being delayed. An object according to still another aspect of the present disclosure is to provide a memory management program that is capable of preventing the execution of a control program having a high priority from being delayed.

To achieve at least one of the abovementioned objects, according to an aspect of the present invention, an image forming apparatus reflecting one aspect of the present invention comprises: a storage that stores a plurality of control programs of the image forming apparatus; a cache memory; and a hardware processor that controls the image forming apparatus, wherein the hardware processor: writes, to the cache memory, a control program that is an execution candidate selected from among the plurality of control programs; determines execution priorities of the respective control programs that are the execution candidates; and locks down, as an object to be locked down, a control program, the priority of which is relatively high among the control programs that are the execution candidates, in the cache memory.

BRIEF DESCRIPTION OF THE DRAWINGS

The objects, advantages, aspects, and features provided by one or more embodiments of the invention will become more fully understood from the detailed description given hereinbelow and the appended drawings which are given by way of illustration only, and thus are not intended as a definition of the limits of the present invention:

FIG. 10 is a flowchart illustrating lockdown processing for stop processing.

DETAILED DESCRIPTION OF EMBODIMENTS

Figure 1:
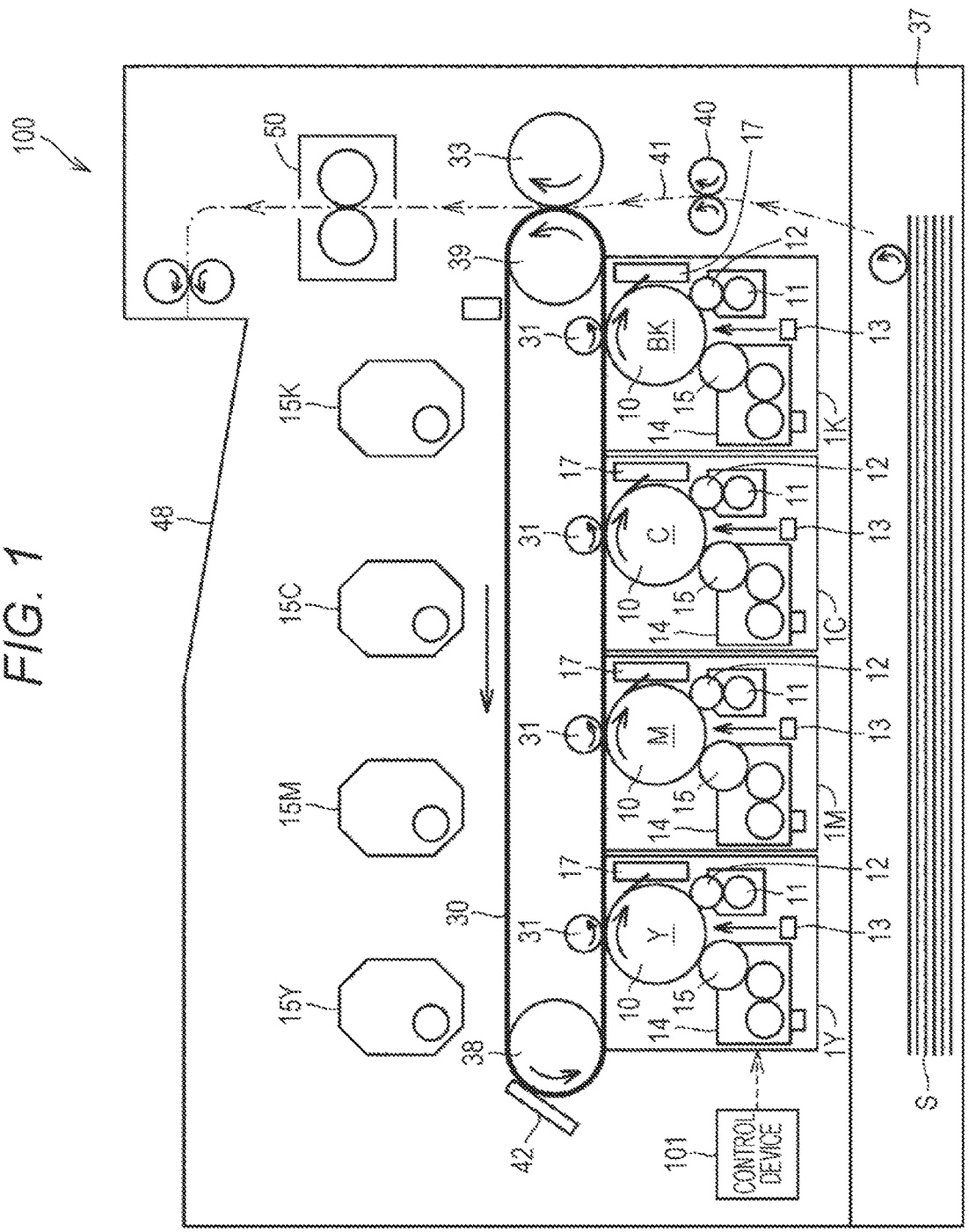
FIG. 1 is a diagram illustrating, as an example, an internal structure of an image forming apparatus according to an embodiment.

Hereinafter, one or more embodiments of the present invention will be described with reference to the drawings. However, the scope of the invention is not limited to the disclosed embodiments. In the following description, identical reference numerals are used to denote identical parts or components. The same applies to the names and functions thereof. Therefore, the detailed explanation thereof will not be repeated. It should be noted that the embodiments and modified examples which will be described below may be selectively combined as appropriate.

[Internal Structure of Image Forming Apparatus 100]

An image forming apparatus 100 according to the present embodiment will be described with reference to FIG. 1. FIG. 1 is a diagram illustrating, as an example, an internal structure of the image forming apparatus 100.

FIG. 1 illustrates the image forming apparatus 100 as a color printer. Although the image forming apparatus 100 as a color printer will be described below, the image forming apparatus 100 is not limited to the color printer. The image forming apparatus 100 may be, for example, a monochrome printer, a facsimile machine, or a multifunction machine (MFP: Multi-Functional Peripheral) that functions as a monochrome printer, a color printer and a facsimile machine.

The image forming apparatus 100 is provided with image forming units 1Y, 1M, 1C, 1K, toner bottles 15Y, 15M, 15C, 15K, an intermediate transfer belt 30, transfer rollers 31, 33, a cassette 37, a driven roller 38, a driving roller 39, a timing roller 40, a cleaning device 42, a fixing device 50, and a CPU 101 as a control device.

The image forming unit 1Y is supplied with a toner from the toner bottle 15Y, and forms a yellow (Y) toner image on a photoreceptor 10. The image forming unit 1M is supplied with a toner from the toner bottle 15M, and forms a magenta (M) toner image on the photoreceptor 10. The image forming unit 1C is supplied with a toner from the toner bottle 15C, and forms a cyan (C) toner image on the photoreceptor 10. The image forming unit 1K is supplied with a toner from the toner bottle 15K, and forms a black (BK) toner image on the photoreceptor 10.

The image forming units 1Y, 1M, 1C, 1K are arranged along the intermediate transfer belt 30 in this order in the rotational direction of the intermediate transfer belt 30. The image forming units 1Y, 1M, 1C, 1K are each provided with a photoreceptor 10 that is formed so as to be rotatable, a charging device 11, an exposing device 13, a developing device 14, and a cleaning device 17.

The charging device 11 includes a charging roller 12. The charging roller 12 comes in contact with the photoreceptor 10. The charging roller 12 uniformly charges a surface of the photoreceptor 10 at a predetermined electric potential.

The exposing device 13 irradiates the photoreceptor 10 with a laser light beam according to a control signal from the CPU 101, and exposes a surface of the photoreceptor 10 according to an input image pattern. As the result, an electrostatic latent image in response to the input image is formed on the photoreceptor 10.

The developing device 14 develops, as a toner image, the electrostatic latent image formed on the photoreceptor 10. More specifically, the developing device 14 applies a developing bias to a developing roller 15 with the developing roller 15 rotated, thereby causing a toner to adhere to a surface of the developing roller 15. The toner is transferred from the developing roller 15 to the photoreceptor 10, and consequently the toner image in response to the electrostatic latent image is developed on the surface of the photoreceptor 10.

The photoreceptor 10 and the intermediate transfer belt 30 come in contact with each other at a part at which the transfer roller 31 is provided. A transfer voltage having a polarity opposite to that of the toner image is applied to the transfer roller 31, which causes the toner image to be transferred from the photoreceptor 10 to the intermediate transfer belt 30. A yellow (Y) toner image, a magenta (M) toner usage, a cyan (C) toner image, and a black (BK) toner image are transferred from the photoreceptor 10 to the intermediate transfer belt 30 by being layered in order. As the result, the color toner image is formed on the intermediate transfer belt 30.

The intermediate transfer belt 30 is extended between the driven roller 38 and the driving roller 39 in a tensioned state. The driving roller 39 is connected to a motor (not illustrated). The CPU 101 controls the motor, which causes the driving roller 39 to rotate. The intermediate transfer belt 30 and the driven roller 38 rotate in conjunction with the driving roller 39. Consequently, the toner image on the intermediate transfer belt 30 is sent to the transfer roller 33.

After the toner image is transferred from the photoreceptor 10 to the intermediate twister belt 30, the cleaning device 17 collects the toner remaining on the surface of the photoreceptor 10.

Sheets of paper S are set in the cassette 37. The timing roller 40 sends the sheets of paper S one by one from the cassette 37 to the transfer roller 33 along a transport path 41. The CPU 101 controls a transfer voltage applied to the transfer roller 33 in synchronization with the timing in which the sheet of paper S is sent out.

The transfer roller 33 applies a transfer voltage having a polarity opposite to that of the toner image to a sheet of paper S that is being transported. This causes the toner image to be attracted from the intermediate transfer belt 30 to the transfer roller 33, and consequently the toner image on the intermediate transfer belt 30 is transferred. The timing of transporting the sheet of paper S to the transfer roller 33 is controlled by the timing roller 40 so as to be aligned with a position of the toner image on the intermediate transfer belt 30. As the result, the toner image on the intermediate transfer belt 30 is transferred to a proper position of the sheet of paper S.

The fixing device 50 pressurizes and heats the sheet of paper S passing through the fixing device 50. This causes the toner image to be fixed on the sheet of paper S. Subsequently, the sheet of paper S is discharged to a tray 48.

After the toner image is transferred from the intermediate transfer belt 30 to the sheet of paper S, the cleaning device 42 collects the toner remaining on the surface of the intermediate transfer belt 30. The collected toner is transported by a transport screw (not illustrated), and is then stored in a waste toner container (not illustrated).

[Hardware Configuration of Image Forming Apparatus 100]

Figure 2:
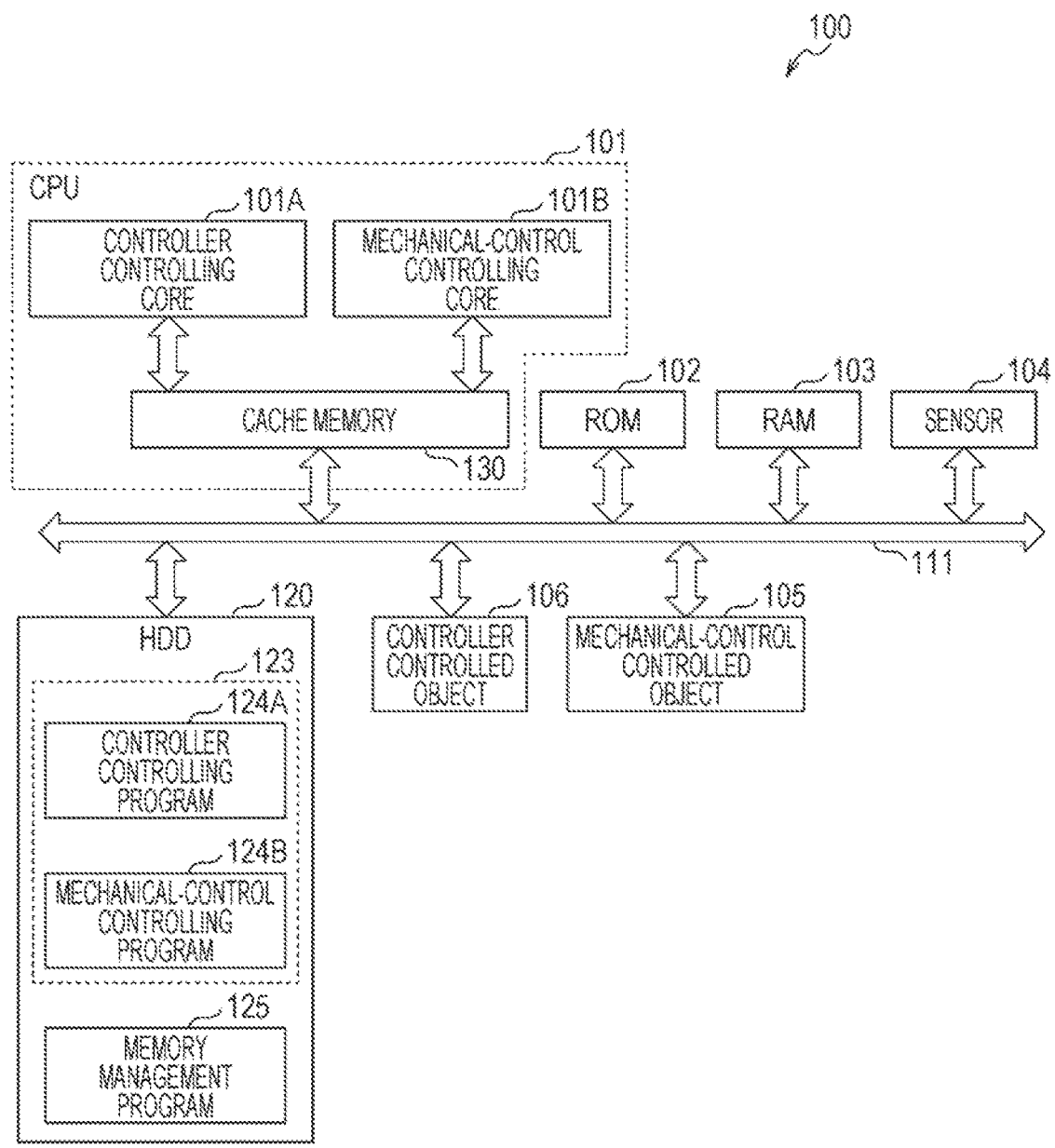
FIG. 2 is a block diagram illustrating a main hardware configuration of the image forming apparatus according to the embodiment.

An example of a hardware configuration of the image forming apparatus 100 will be described with reference to FIG. 2. FIG. 2 is a block diagram illustrating a main hardware configuration of the image forming apparatus 100.

As shown in FIG. 2, the image forming apparatus 100 includes the CPU 101, a Read Only Memory (ROM) 102, a Random Access Memory (RAM) 103, a sensor 104 as a detector, a mechanical-control controlled object 105, a controller controlled object 106, and a Hard Disk Drive (HDD) 120. These configurations are connected to one another through an internal bus 111.

The CPU 101 is a multi-core processor, and has a controller controlling core 101A, a mechanical-control controlling core 101B, and a cache memory 130, all of which are built therein. The cache memory 130 may be configured integrally with the CPU 101, or may be configured separately from the CPU 101. The controller controlling core 101A performs controller control. The mechanical-control controlling core 101B controls mechanical control.

The controller control is controlling image processing and the image forming apparatus 100 as a whole. As an example, the controller control includes: image processing that obtains image data to perform bit map expansion or the like; network communication processing that communicates with a Personal Computer (PC) or other apparatuses; and processing of controlling, for example, an operation panel that accepts an instruction from a user or the like. The controller control is best-effort type processing that performs, for example, a large amount of data processing required by image processing or network communications, and a response from a user, at as high speed as possible.

The mechanical-control control is mechanically controlling the image forming apparatus 100 so as to execute image forming processing specified by the controller control. As an example, the mechanical-control control includes: transport control of a print medium; control of a semiconductor laser; and mechanical control such as temperature regulation. A delay in the mechanical-control control causes the print quality to decrease, and therefore the mechanical-control control requires high real-time performance.

The controller controlling, core 101A and the mechanical-control controlling core 101B share the cache memory 130, the ROM 102, the RAM 103 and the HDD 120. The ROM 102 stores a boot program for starting up the CPU 101 at the time of turning on the power of the image forming apparatus 100. The RAM 103 is used as a working storage area of the CPU 101. The HDD 120 stores a control program 123 for controlling the image forming apparatus 100, and a memory management program 125. The control program 123 includes a controller controlling program 124A, and a mechanical-control controlling program 124B.

The controller controlling core 101A reads the controller controlling program 124A from the HDD 120, and controls the controller controlled object 106 with the RAM 103 used as a working storage area. The controller controlled object 106 is, for example, an image processing circuit, a network device, an operation panel or the like. Moreover, the controller controlling core 101A instructs the mechanical-control controlling core 101B to execute image forming processing.

The mechanical-control controlling core 101B reads the mechanical-control controlling program 124B from the HDD 120, and controls the mechanical-control controlled object 105 with the RAM 103 used as a working storage area. The mechanical-control controlled object 105 is, for example, a motor, a clutch, a sensor or the like.

Usually, the CPU 101 accesses a control program stored in a main memory such as the RAM 103, thereby executing the control program. At this point of time, the CPU 101 writes the accessed control program to the cache memory 130. The access speed for the cache memory 130 is faster than the access speed for other storages (for example, the HDD 120, and the main memory such as the RAM 103). Therefore, when the CPU 101 accesses the same control program next time, the CPU 101 is capable of accessing the same at higher speed. Typically, a storage capacity of the cache memory 130 is smaller than that of the main memory, and accordingly if accessed control programs are consecutively written to the cache memory 130, the cache memory 130 runs short of space.

When a new control program is written to the cache memory 130 in a state in which the cache memory 130 has no space, the oldest control program is pushed out of the cache memory 130 (so-called cache-out). The next access to the control program that has been cached out is not speeded up because no cache hit of the control program occurs. For the purpose of preventing the above, the image forming apparatus 100 executes cache lockdown in the cache memory 130. The cache lockdown is processing of prohibiting a control program stored in a part or all of areas of the cache memory 130 from being cached out. The CPU 101 has such a cache lockdown function. The cache lockdown causes a specific control program not to be cached out, and therefore an access to the control program is always speeded up.

[Lockdown Processing by Image Forming Apparatus 100]

Figure 3:
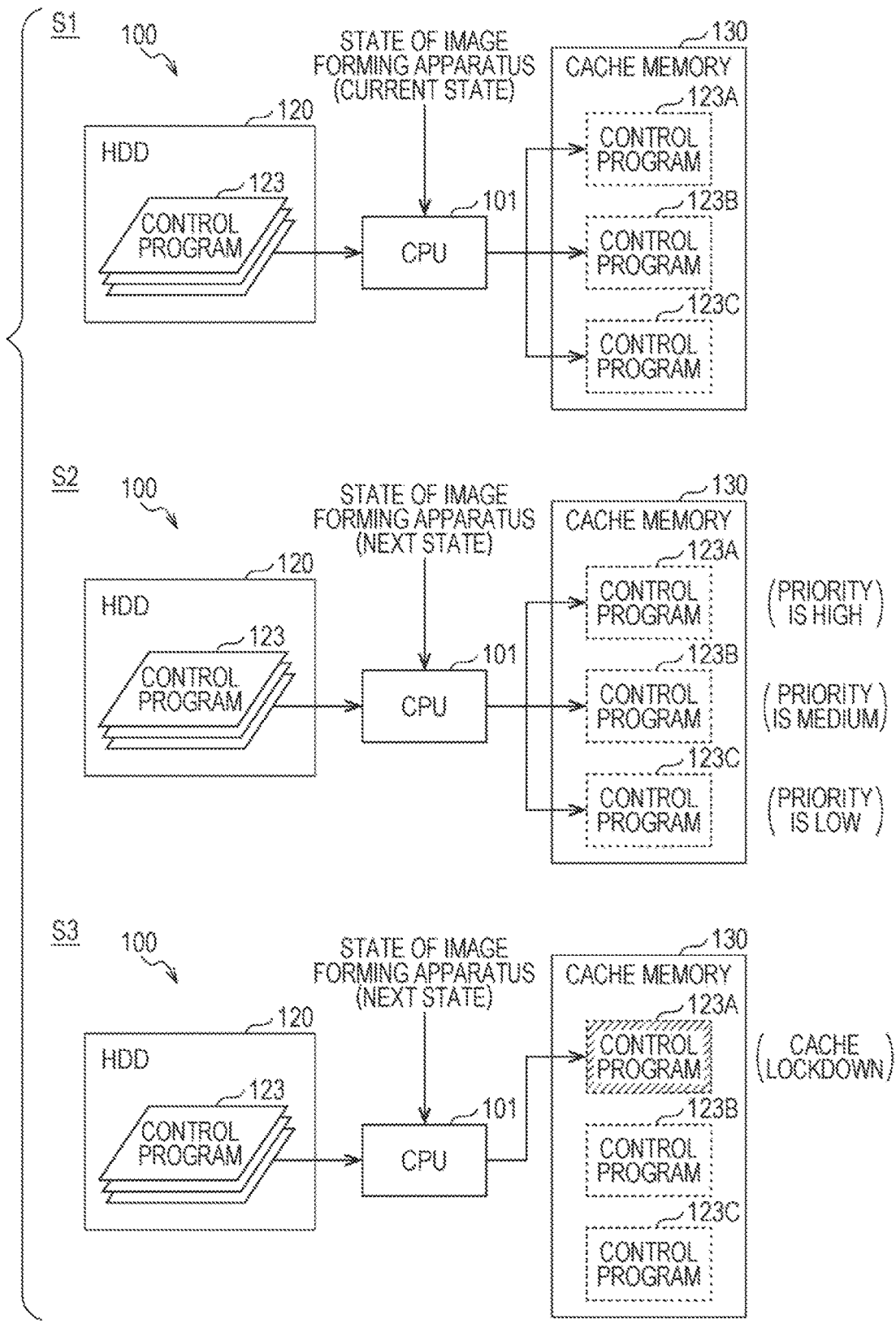
FIG. 3 is a drawing illustrating, in time series, lockdown processing by the image forming apparatus according to the embodiment.

Lockdown processing by the image forming apparatus 100 will be described with reference to FIG. 3. FIG. 3 is a drawing illustrating, in time series, lockdown processing by the image forming apparatus 100.

In step S1, the CPU 101 writes, to the cache memory 130, a control program that is an execution candidate selected from among a plurality of control programs 123 stored beforehand in the HDD 120. In this case, on the basis of a current state of the image forming apparatus 100, the CPU 101 estimates, as an execution candidate, a control program having a high possibility of being executed next after the current state. The estimation method will be described in detail later. The CPU 101 writes the control program as the execution candidate to the cache memory 130. In the example shown in FIG. 3, the control programs 123A to 123C that are execution candidates are written to the cache memory 130.

In step S2, the CPU 101 determines execution priorities of the respective control programs 123A to 123C that are the execution candidates. Preferably, every time a state of the image forming apparatus 100 changes, the CPU 101 determines execution priorities on the basis of the state after the change. A method for determining the priorities will be described in detail later. In the example shown in FIG. 3, the priority of the control program 123A is set at "high". The priority of the control program 123B is set at "middle". The priority of the control program 123B is set at "low".

In step S3, the CPU 101 locks down, in the cache memory 130, a control program in which the priority determined in step S2 is relatively high among the control programs 123A to 123C that are the execution candidates. In a certain aspect, the CPU 101 treats at least the control program 123A, the priority of which is the highest among the control programs 123A to 123C that are the execution candidates, as an object to be locked down. In another aspect, the CPU 101 treats, as objects to be locked down, a predetermined number of control programs each having a higher priority among the control programs 123A to 123C that are the execution candidates. Preferably, the CPU 101 locks down control programs in order of decreasing priority within a range of lock-down possible capacity.

A control program, the execution priority of which is high, is locked down with higher priority than those of the other control programs. Consequently, the CPU 101 is capable of preventing a control program having a high possibility of being executed front being cached out from the cache memory 130. This enables the CPU 101 to shorten the processing time of a control program having a high priority. As the result, the CPU 101 is capable of preventing the execution of such a high-priority control program that requires real-time performance from being delayed.

[Functional Configuration of Image Forming Apparatus 100]

Figure 4:
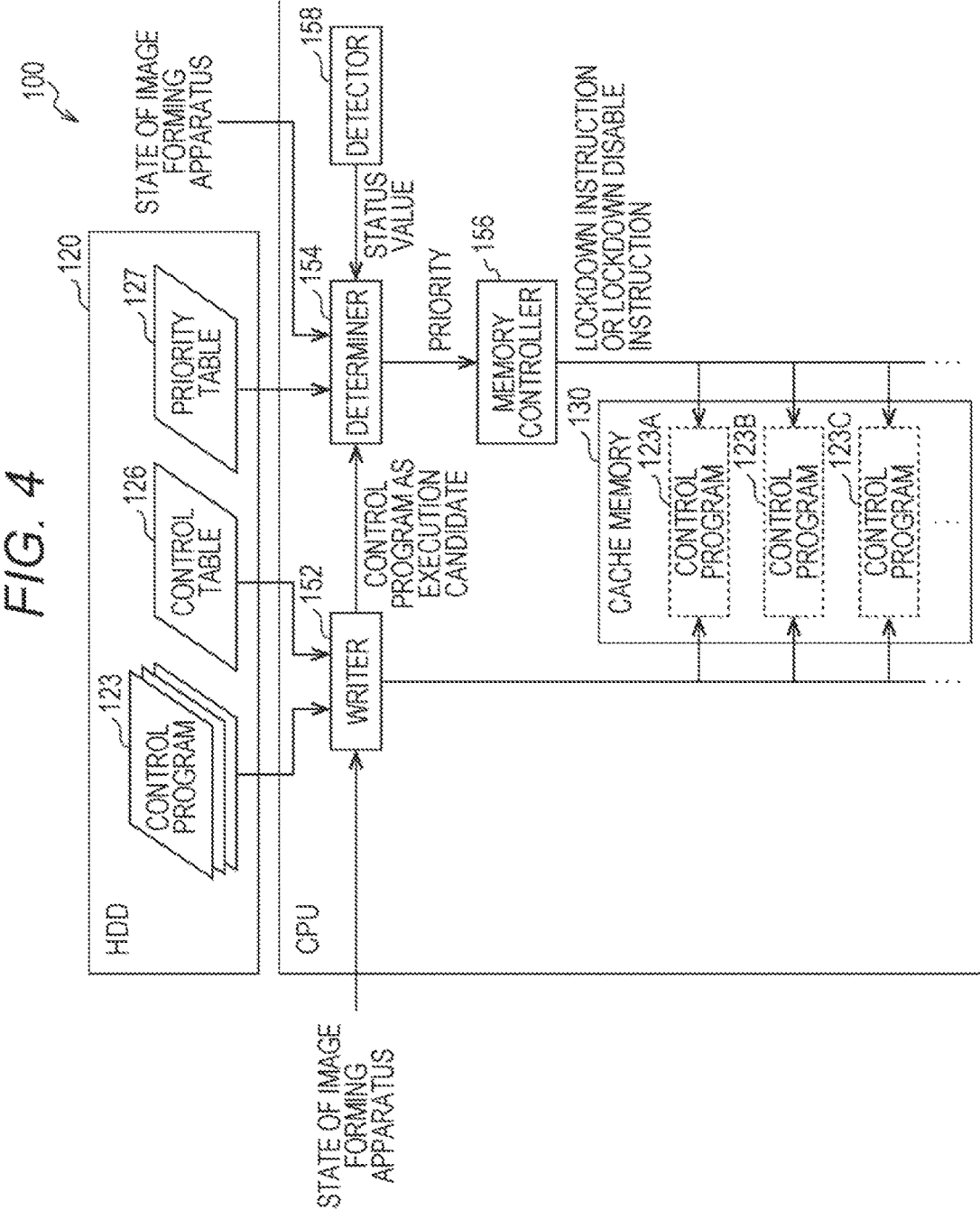
FIG. 4 is a diagram illustrating, as an example, a functional configuration of the image forming apparatus according to the embodiment.

Functions of the image forming apparatus 100 will be described with reference to FIGS. 4 and 5. FIG. 4 is a diagram illustrating, as an example, a functional configuration of the image forming apparatus 100.

As shown in FIG. 4, as a main hardware configuration, the image forming apparatus 100 is equipped with the CPU 101 and the HDD 120. The CPU 101 is equipped with the cache memory 130. As functional configurations, the CPU 101 includes a writer 152, a determiner 154, a memory controller 156, and a detector 158. These functional configurations will be described below in sequence.

(Writer 152)

The operation of the image forming apparatus 100 by the above-described mechanical-control processing is managed by being divided into a plurality of states according to a function of the image forming apparatus 100. The image forming apparatus 100 makes a transition to the next state according to an event that has occurred in each state, and performs operation requested by the event. An event that occurs is limited according to a state of mechanical-control processing, and therefore a next transition destination is also limited.

For example, a state of the image forming apparatus 100 does not shift from a stopped state to a print state. The stopped state means a state in which printing cannot be performed. Stop processing is executed in a case where a device part gets out of order, a sheet of paper is left inside the image forming apparatus 100, or a cover of the image forming apparatus is open. When print processing is executed, the image forming apparatus 100 is required to shift from a stopped state to a state in which printing can be performed. In this manner, as a state of the mechanical control, a state of the next execution subsequent to a current state is limited to some operations.

Paying attention to this point, on the basis of a current state of the image forming apparatus 100, the writer 152 estimates, as an execution candidate, a control program having a high possibility of being executed next after the current state, and writes the control program as the execution candidate to the cache memory 130.

Typically, the writer 152 estimates a control program as an execution candidate by referring to a control table 126 (control information). FIG. 5 is a drawing illustrating, as example, a data structure of the control table 126.

In the control table 126, a control program in a current state of the image forming apparatus 100 is associated with control programs each having a high possibility of being executed in the next state. In other words, in the control table 126, control programs each having a high possibility of being executed next are prescribed for each state of the image forming apparatus 100. The control table 126 may be set beforehand when the image forming apparatus 100 is designed, or may be arbitrarily set by a user.

Among the control programs prescribed in the control table 126, the writer 152 estimates, as execution candidates, control programs that are associated with a current state of the image forming apparatus 100. For example, in a case where a current state of the image forming apparatus 100 is a "standby" state, a control program group 127 having a high possibility of being executed next after the "standby" state is estimated as an execution candidate. Subsequently, the writer 152 writes the control program group 127 to the cache memory 130, in a case where any of control programs in the control program group 127 is executed, the processing tune of the control program is shortened.

(Determiner 154)

Referring to FIG. 4 again, the determiner 154 determines execution priorities of the respective control programs written to the cache memory 130 as the execution candidates. Typically, the execution priorities are determined on the basis of the above-described control table 126 (refer to FIG. 5).

In the control table 126, each control program in the next state is associated with an execution priority beforehand. The priority may be set beforehand when the image forming apparatus 100 is designed, or may be arbitrarily set by a user.

As an example, an event that shifts from a "standby" state to a "FW (Firmware) update" state occurs when a serviceman requests the image forming apparatus 100 to carry out a FW update. Accordingly, when usually using the image forming apparatus 100, a user does not cause the image forming apparatus 100 to shift from the "standby" state to the "FW update" state. Therefore, a priority of the control program for the FW update is set lower than those of the other control programs.

By referring to the control table 126, the determiner 154 obtains execution priorities of the respective control programs that are the execution candidates, and that have been written to the cache memory 130 by the writer 152. For example, with respect to the control program group 127 as the execution candidate, the priority of the control program that is associated with a "print" state is the highest. The priority of the control program that is associated with a "low power" state is the second highest. The priority of the control program that is associated with an "image adjustment" state is the third highest. The priority of the control program that is associated with a "stop" state is the lowest.

(Memory Controller 156)

In a case where the mechanical-control controlling core and the controller controlling core share the cache memory 130, when the whole cache memory 130 is locked down by one of a control program for the mechanical-control control and a control program for the controller control, processing by the other core is delayed. For example, in a case where the control program for the mechanical-control control is not written to the cache memory 130, a mechanical-control device may be damaged. Meanwhile, in a case where the control program for the controller control is not written to the cache memory 130, there is a possibility that the execution of print processing will not be completed within a predetermined time period. Thus, it is necessary to prevent the cache memory 130 from being occupied due to the lockdown of one control program.

Accordingly, when the image forming apparatus 100 has enough lock-down possible capacity, the image forming apparatus 100 locks down the new control program. When the image forming apparatus 100 does not have enough lock-down possible capacity, the image forming apparatus 100 compares the priority of the control program that has already been locked down with the priority of the control program to be locked down, and then disables a lockdown in order of increasing priority.

More specifically, the memory controller 156 manages the lock-down possible capacity in the cache memory 130. The lock-down possible capacity is set beforehand. Typically, the lock-down possible capacity is set at a memory size of the cache memory 130 or lower. It should be noted that the lock-down possible capacity may be dynamically changed according to each control state. In a case where a data size of a control program to be locked down is smaller than the lock-down possible capacity, the memory controller 156 locks down the control program to be locked down in the cache memory 130. Subsequently, the memory controller 156 subtracts the data size of the control program to be locked down from the lock-down possible capacity.

Meanwhile, in a case where the data size of the control program to be locked down is larger than the lock-down possible capacity, the memory controller 156 disables a lockdown in the cache memory 130 in order of increasing execution priority of a control program. In this case, the memory controller 156 repeatedly disables a lockdown until the capacity for locking down the control program to be locked down is reserved in the cache memory 130. In other words, the memory controller 156 disables a lockdown of a control program having the lowest execution priority among control programs that have already been locked down, and then adds the data size of the control program to the lock-down possible capacity. This disabling processing is repeated until the lock-down possible capacity becomes larger than the size of the control program to be locked down. Subsequently, the memory controller 156 locks down the control program to be locked down, and then subtracts the data size of the control program from the lock-down possible capacity.

In this manner, the memory controller 156 locks down a control program having a relatively high execution priority among the control programs 123A to 123C written to the cache memory 130, which is determined by the determiner 154, in the cache memory 130 as an object to be locked down. This enables the memory controller 156 to prevent the control program having a high possibility of being executed from being cached out. As the result, the memory controller 156 is capable of shortening the processing time of a control program having a high execution priority, and is capable of preventing the execution of such a high-priority control program that requires real-time performance from being delayed.

[Lockdown Processing for Mechanical-control Processing]

Figure 6:
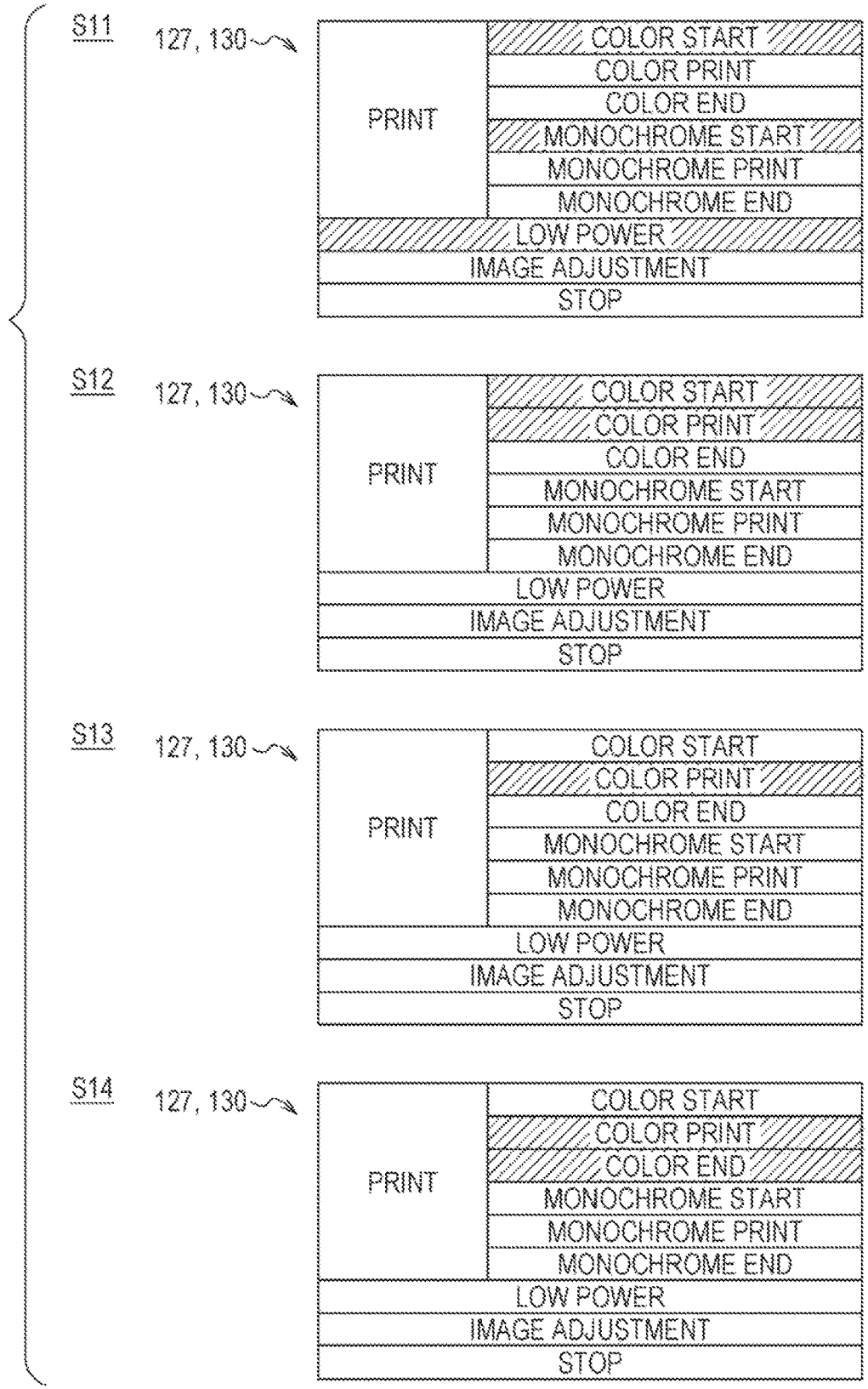
FIG. 6 is a drawing illustrating a state in which an object to be locked down is switched for mechanical-control processing written in a cache memory.

Taking the above-described mechanical control processing as an example, lockdown processing will be described with reference to FIG. 6. FIG. 6 is a drawing illustrating a state in which an object to be locked down is switched for mechanical-control processing written in the cache memory 130.

Figure 5:
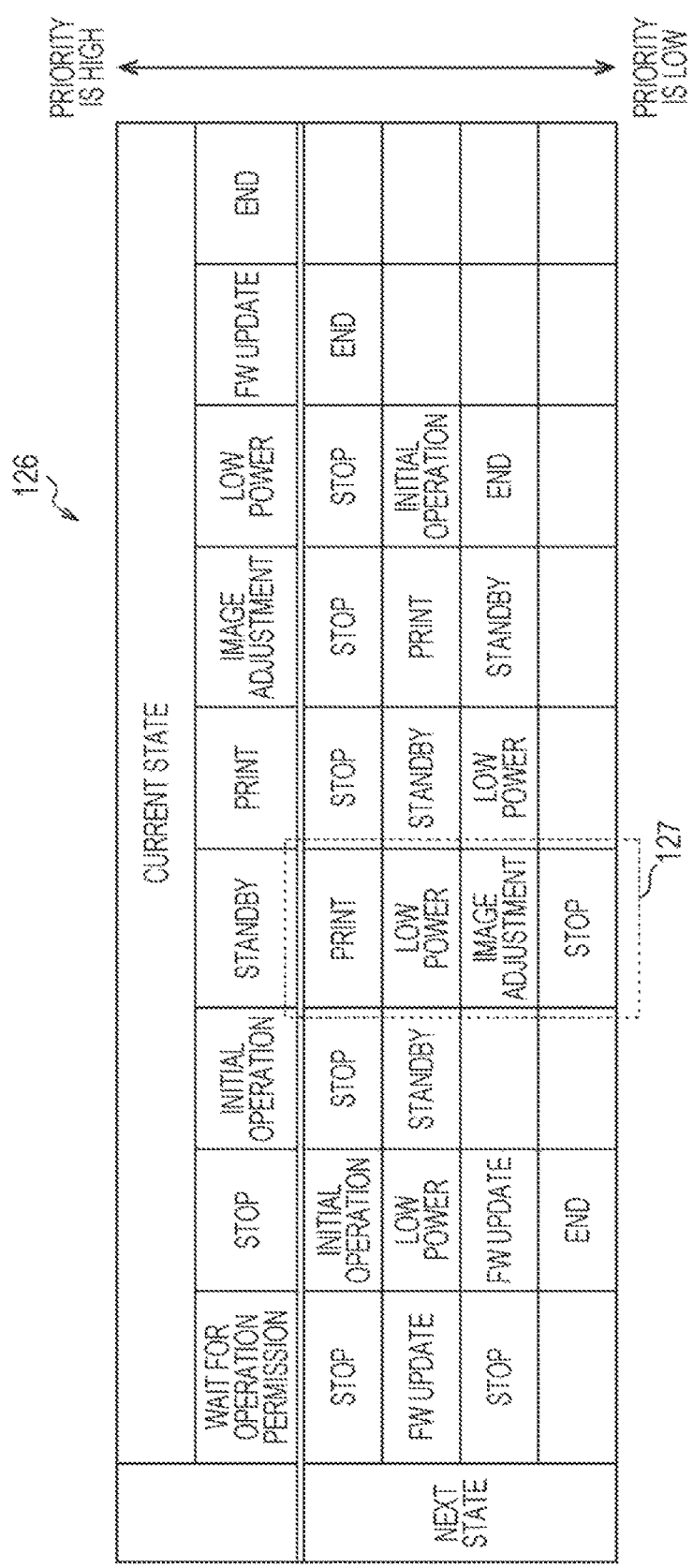
FIG. 5 is a drawing illustrating, as example, a data structure of a control table.

The control program group 127 shown in FIG. 6 corresponds to the control program group 127 shown in FIG. 5. In FIG. 6, print processing is divided into "color start" processing, "color print" processing, "color end" processing, "monochrome start" processing, "monochrome print" processing, and "monochrome end" processing.

In step S11, when a state of the mechanical control has shifted to a standby state, the image forming apparatus 100 writes a control program having a high possibility of being executed next to the cache memory 130. As the result, the control program group 127 is written to the cache memory 130. Subsequently, the image forming apparatus 100 locks down "print" processing and "low power" processing, each of which has a high possibility of being executed, in the control program group 127. The "print" processing is executed in order of "start", "print" and "end". Therefore, first of all, the "color start" processing, and the "monochrome start" processing are locked down.

Incidentally, although either "color print" or "monochrome print" is executed, which print instruction is accepted, color or monochrome, is not determined in the standby state. Therefore, the image forming apparatus 100 locks down both of the color start processing and the monochrome start processing.

In step S12, it is assumed that the image forming apparatus 100 has accepted a color print instruction. On the basis of the acceptance, a state of the mechanical control shifts to a "print" state. In this case, there is no possibility that a state of the mechanical control will shift to a "low power" state. Therefore, the image forming apparatus 100 disables a lockdown of "low power" processing. In addition, since the print instruction is color, the "monochrome start" processing is not executed. Therefore, the image forming apparatus 100 disables a lockdown of the "monochrome start" processing. After the execution of the "color start" processing, the "color print" processing is executed, and thus the image forming apparatus 100 executes a lockdown of the "color print" processing.

In step S13, it is assumed that the "color start" processing has ended. On the basis of the end, the image forming apparatus 100 disables a lockdown of the "color start" processing.

In step S14, it is assumed that the image forming apparatus 100 has accepted a print instruction for the last sheet of paper. When printing of the last sheet of paper is completed, the "color end" processing will be executed next. Therefore, the image forming apparatus 100 locks down the "color end" processing.

Figure 7:
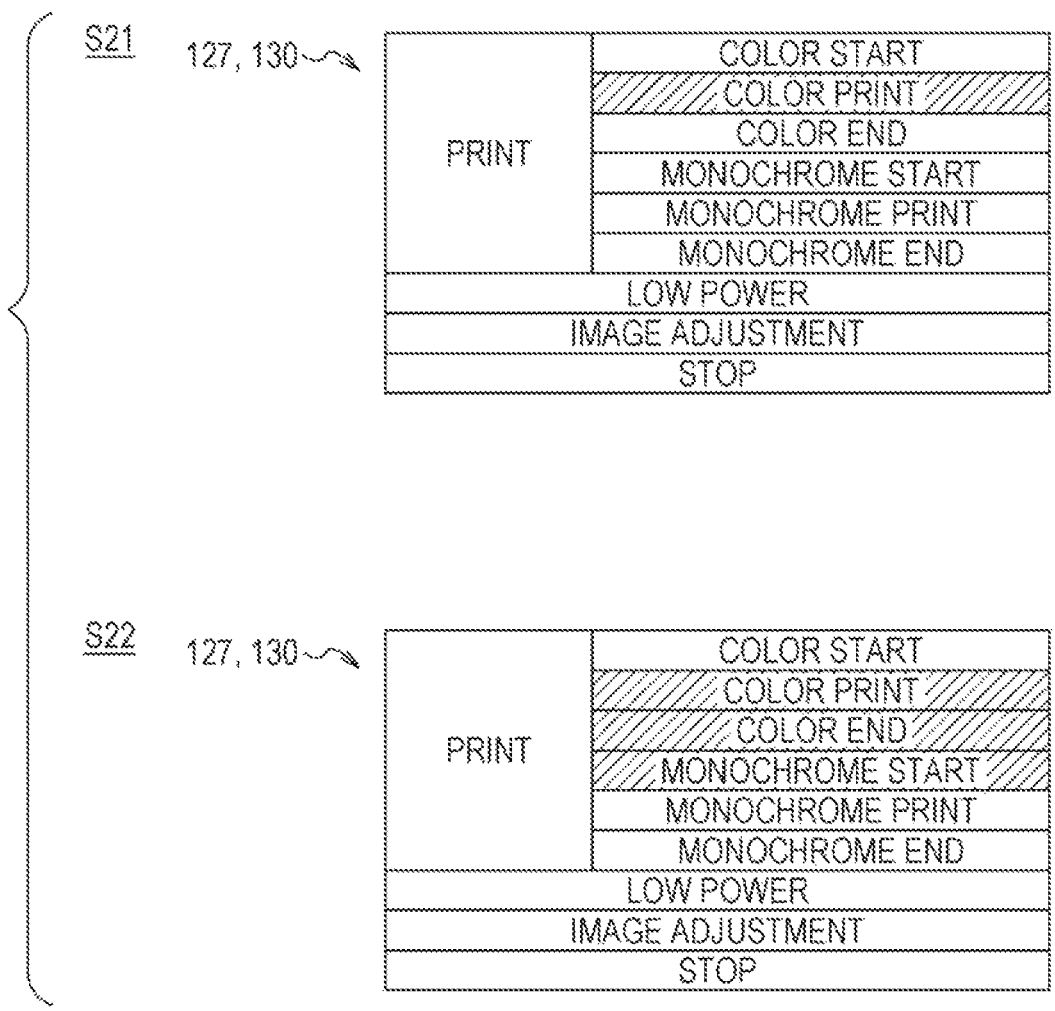
FIG. 7 is a drawing illustrating processing of switching an object to be locked down in a case where a monochrome print instruction has been accepted.

FIG. 7 is a drawing illustrating processing of switching an object to be locked down in a case where a monochrome print instruction has been accepted.

In step S21, it is assumed that the "color print" processing is locked down. In this case, it is assumed that the image forming apparatus 100 has accepted a monochrome print instruction.

In step S22, the image forming apparatus 100 locks down the "color end" processing, and locks down the "monochrome start" processing. Next, when the "color print" processing has ended, the image forming apparatus 100 executes the "color end" processing. Subsequently, when the "color end" processing has ended, the image forming apparatus 100 executes the "monochrome start" processing.

In this manner, the print control is executed in order of "start" processing, "print" processing, and "end" processing. It is not necessary to lock down all control programs required for the print control at a time. Accordingly, a required control program is locked down as appropriate. The same applies to color printing/monochrome printing and single-sided printing/double-sided printing.

[Control Flow of Lockdown Processing]

Figure 8:
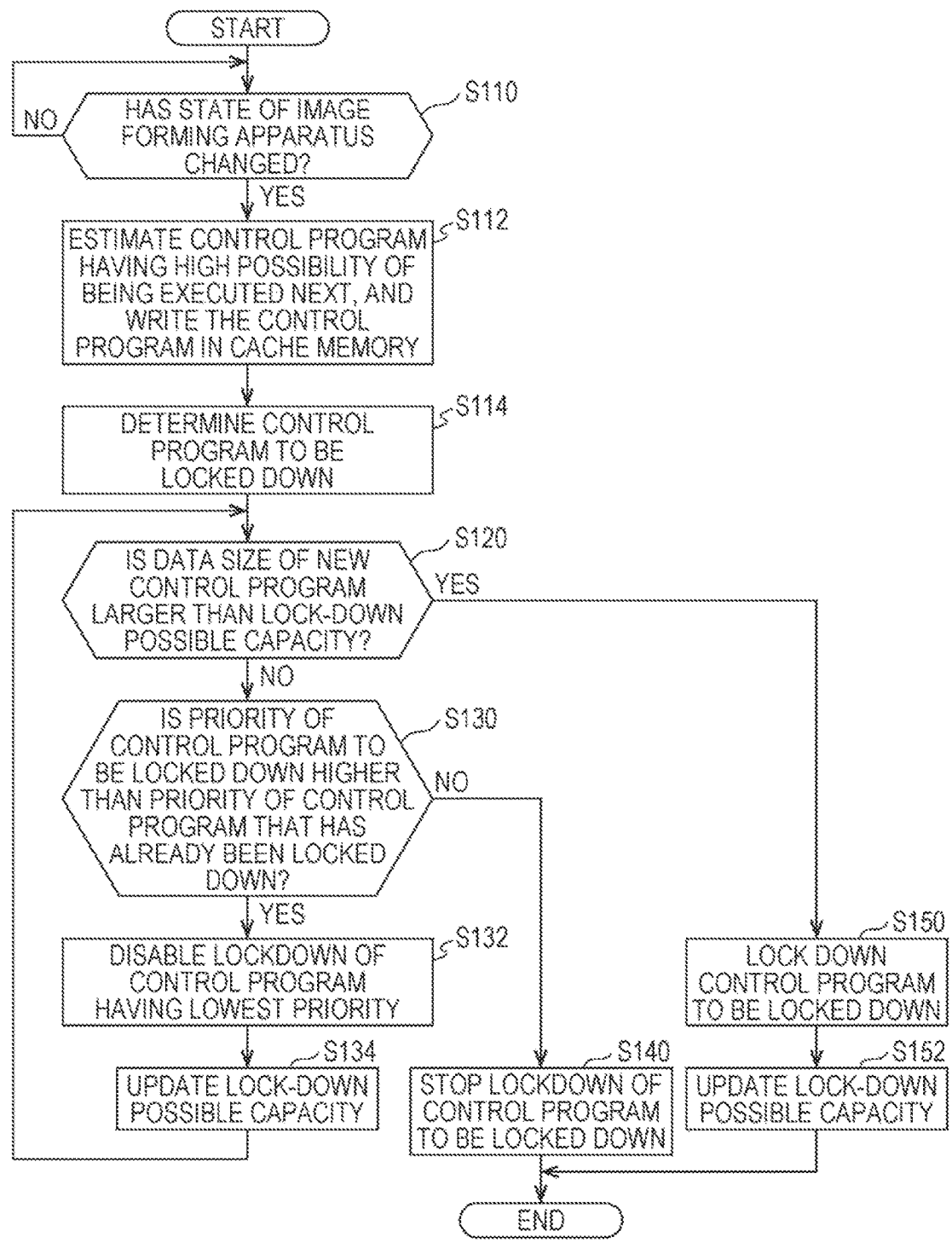
FIG. 8 is a flowchart illustrating lockdown processing.

A control flow of lockdown processing will be described with reference to FIG. 8. FIG. 8 is a flowchart illustrating the lockdown processing. Processing shown in FIG. 8 is realized by causing the CPU 101 of the image forming apparatus 100 to execute a program. In another aspect, a part or all of the processing may be executed by a circuit element or other hardware components.

In step S110, the CPU 101 determines whether or not a state of the image forming apparatus 100 has changed. Typically, the CPU 101 stores the last state of the image forming apparatus 100, and in a case where a current state of the image forming apparatus 100 differs from the last state, the CPU 101 determines that the state of the image forming apparatus 100 has changed. In a case where it is determined that the state of the image forming apparatus 100 has changed (YES in step S110), the CPU 101 switches the control to step S112. If no (NO in step S110), the CPU 101 executes the processing in step S110 again.

In step S112, as the above-described writer 152 (refer to FIG. 4), the CPU 101 estimates a control program having a high possibility of being executed in a state subsequent to the current state of the image forming apparatus 100, and then writes the control program to the cache memory 130.

In step S114, as the above-described determiner 154 (refer to FIG. 4), the CPU 101 determines a new control program to be locked down from among the control programs written to the cache memory 130 in step S112. More specifically, the CPU 101 determines execution priorities of the respective control programs written to the cache memory 130, and determines a control program having a relatively high priority as a control program to be locked down.

In step S120, the CPU 101 determines whether or not a data size of the control program to be locked down is larger than the lock-down possible capacity. In a case where it is determined that the data size of the control program to be locked down is larger than the lock-down possible capacity (YES in step S120), the CPU 101 switches the control to step S150. If no (NO in step S120), the CPU 101 switches the control to step S130.

In step S130, the CPU 101 determines whether or not the priority of the control program to be locked down is higher than that of at least one of the control programs that have already been locked down. In a case where it is determined that the priority of the control program to be locked down is higher than that of at least one of the control programs that have already been locked down (YES in step S130), the CPU 101 switches the control to step S132. If no (NO in step S130), the CPU 101 switches the control to step S140.

In step S132, as the above-described memory controller 156 (refer to FIG. 4), the CPU 101 identifies a control program having the lowest execution priority among the control programs that have already been locked down, and then disables the lockdown of the identified control program. Typically, on the cache memory 130, the CPU 101 addresses a data area in which the lockdown is to be disabled. Thus, the CPU 101 disables the lockdown in the specified data area.

In step S134, as the above-described memory controller 156, the CPU 101 adds the data size of the control program, the lockdown of which has been disabled in step S132, to the current lock-down possible capacity. Thus, the CPU 101 updates the lock-down possible capacity.

In step S140, as the above-described memory controller 156, the CPU 101 stops the lockdown for the object to be locked down determined in step S114.

In step S150, as the above-described memory controller 156, the CPU 101 executes the lockdown for the object to be locked down determined in step S114. Typically, on the cache memory 130, the CPU 101 addresses a data area in which the lockdown is performed. Thus, the CPU 101 performs the lockdown for the specified data area.

In step S152, as the above-described memory controller 156, the CPU 101 subtracts the data size of the control program, the lockdown of which has been executed in step S150, from time current lock-down possible capacity. Thus, the CPU 101 updates the lock-down possible capacity.

[Control Flow of Lockdown Disabling Processing]

Figure 9:
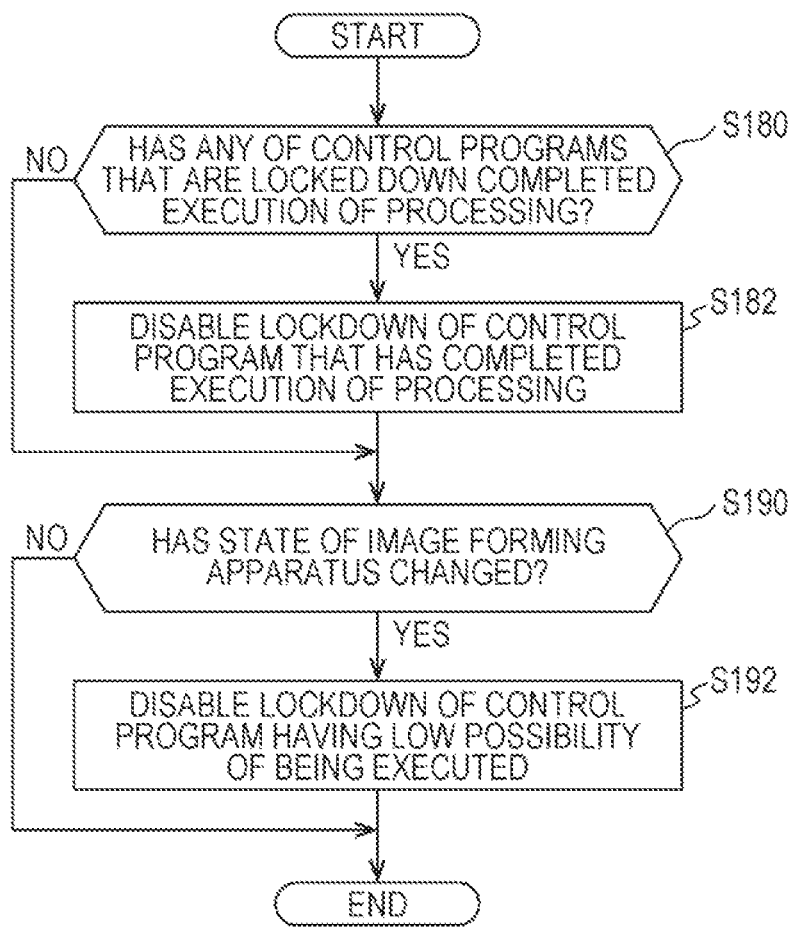
FIG. 9 is a flowchart illustrating lockdown disabling processing.

A control flow of lockdown disabling processing will be described with reference to FIG. 9. FIG. 9 is a flowchart illustrating lockdown disabling processing. Processing shown in FIG. 9 is realized by causing the CPU 101 of the image forming apparatus 100 to execute a program. In another aspect, a part or all of the processing may be executed by a circuit element or other hardware components.

The CPU 101 periodically executes processing shown in FIG. 9. In addition, the CPU 101 executes the processing shown in FIG. 9 in parallel with the processing shown ire FIG. 8.

In step S180, the CPU 101 determines whether or not any of control programs locked down in the cache memory 130 has completed the execution of processing thereof. In a case where it is determined that any of the control programs locked down in the cache memory 130 has completed the execution of processing thereof (YES in step S180), the CPU 101 switches the control to step S182. If no (NO in step S180), the CPU 10 l switches the control to step S190.

In step S182, the CPU 101 disables the lockdown of the control program that has completed the execution of processing thereof. Typically, on the cache memory 130, the CPU 101 addresses a data area in which the lockdown is to be disabled. Thus, the CPU 101 disables the lockdown for the specified data area.

In step S190, the CPU 101 determines whether or not a state of the image forming apparatus has changed. Typically, the CPU 101 stores the last state of the image forming apparatus 100, and in a case where a current state of the image forming apparatus 100 differs from the last state, the CPU 101 determines that the state of the image forming apparatus 100 has changed. In a case where it is determined that the state of the image forming apparatus 100 has changed (YES in step S190), the CPU 101 switches the control to step S192. If no (NO in step S190), the CPU 101 ends the processing shown in FIG. 9.

In step S192, the CPU 101 disables a lockdown of a control program having a low possibility of being executed in a current state of the image forming apparatus 100. Typically, on the cache memory 130, the CPU 101 addresses a data area in which the lockdown is to be disabled. Thus, the CPU 101 disables the lockdown for the specified data area.

In this manner, in a case where the execution of the control program that is locked down has been completed, or in a case where the state of the image forming apparatus 100 has changed, the CPU 101 executes lockdown disabling processing.

Incidentally, even if a lockdown of a certain control program has been disabled, the control program remains in the cache memory 130. However, when a new control program is written to the cache memory 130, the control program, the lockdown of which has been disabled, is overwritten by the new control program. In other words, the control program, the lockdown of which has been disabled, will be cached out sooner or later.

[Control Flow of Lockdown Interrupt Processing]

The mechanical-control control also executes a lockdown for a program other than sequential control programs such as a print control that executes start processing, print processing, and end processing in order. As an example, the CPU 101 executes a lockdown for stop processing and image adjustment processing of the image forming apparatus 100. The stop processing is executed in a case where a failure of the image forming apparatus 100 has occurred. The image adjustment processing is executed in a case where the quality at the time of image forming is not maintained. The stop processing and the image adjustment processing are both executed after the print processing is interrupted. In other words, the stop processing and the image adjustment processing are executed by interrupting the print processing.

A determination as to whether or not to execute the interrupt processing is made on the basis of a status value that represents a status in the image forming apparatus 100. The status value is, for example, the temperature the image forming apparatus 100, the number of sheets printed until now, or the like. The image forming apparatus 100 executes interrupt processing in a case where the status value reaches a predetermined threshold value. In other words, the status value functions as a trigger for executing a predetermined control program.

As the status value gets closer to the predetermined threshold value, there is a higher possibility that interrupt processing will be executed. Paying attention to this point, the image forming apparatus 100 makes a priority of interrupt processing (predetermined control program) higher as the status value gets closer to the predetermined threshold value.

More specifically, when the status value has exceeded a first threshold value, the image forming apparatus 100 stores a control program for executing interrupt processing in the cache memory 130, and locks down the interrupt processing. Subsequently, when the status value has exceeded a second threshold value that is larger than the first threshold value, the image forming apparatus 100 executes the interrupt processing. Consequently, when the timing of executing the interrupt processing comes, the interrupt processing is not delayed.

Lockdown processing for stop processing that is an example of interrupt processing will be described below with reference to FIG. 10. FIG. 10 is a flowchart illustrating lockdown processing for stop processing. Processing shown in FIG. 10 is realized by causing the CPU 101 of the image forming apparatus 100 to execute a program. In another aspect, a part or all of the processing may be executed by a circuit element or other hardware components.

In step S210, the CPU 101 determines whether or not a color print instruction has been accepted. In a case where it is determined that a color print instruction has been accepted (YES in step S210), the CPU 101 switches the control to step S212. If no (NO in step S210), the CPU 101 executes the processing in step S210 again.

In step S212, the CPU 101 writes color print processing to the cache memory 130, and locks down the color print processing.

In step S214, the CPU 101 starts the color start processing.

In step S216, the CPU 101 counts up a status value that functions as a trigger for executing stop processing.

In step S218, the CPU 101 writes a control program for executing the stop processing of the image forming apparatus 100 to the cache memory 130.

In step S220, the CPU 101 determines whether not the color start processing has been completed. In a case where it is determined that the color start processing has been completed (YES in step S220), the CPU 101 switches the control to step S222. If no (NO in step S220), the CPU 101 returns the control to step S216.

In step S222, the CPU 101 disables the lockdown of the color start processing.

In step S224, the CPU 101 starts the color print processing.

In step S226, the CPU 101 counts up a status value that functions as a trigger for executing the stop processing.

In step S228, the CPU 101 determines whether or not a status value that functions as a trigger for executing the stop processing has exceeded a predetermined threshold value (first threshold value). The first threshold value is smaller than a second threshold value used as an execution reference as to whether or not to execute the stop processing. In a case where it is determined that the status value that functions as a trigger for executing the stop processing has exceeded the predetermined threshold value (YES in step S228), the CPU 101 switches the control to step S230. If no (NO in step S228), the CPU 101 switches the control to step S232.

In step S230, the CPU 101 writes the stop processing of the image forming apparatus 100 to the cache memory 130, and locks down the stop processing.

In step S232, the CPU 101 determines whether or not a print instruction for the next page has been accepted. In a case where it is determined that a print instruction for the next page has been accepted (YES in step S232), the CPU 101 ends the processing shown in FIG. 10. If no (NO in step S232), the CPU 101 returns the control to step S226.

[Status Value]

As described above, as a status value representing a status of the image forming apparatus 100 gets higher, the CPU 101 makes an execution priority higher for a predetermined image processing program (for example, a stop control program) corresponding to the status value. In other words, the image forming apparatus 100 monitors various status values, and when any of the status values has exceeded a predetermined threshold value, the image forming apparatus 100 executes an image processing program related to a kind of the status value. Kinds of status values will be described below.

The status value is detected by, for example, the above-described sensor 104 (refer to FIG. 2). As an example, the sensor 104 is a paper sheet sensor. The paper sheet sensor is arranged in such a manner that a detection range includes the transport path 41 of a sheet of paper (refer to FIG. 1), and detects that the sheet of paper has passed through the detection range. On the basis of are output value from the paper sheet sensor, the image forming apparatus 100 measures, as a status value, the passing time taken when the sheet of paper passes through the detection range. In a case where the passing time is longer than a predetermined time period, it is indicated that the sheet of paper remains inside the image forming apparatus 100 for some reason or other. In this case, the image forming apparatus 100 executes the stop processing so as to prevent a device from being damaged by the sheet of paper.

More specifically, when the passing time of the sheet of paper has exceeded the first threshold value, the image forming apparatus 100 writes a control program for executing the stop processing to the cache memory 130, and then locks down the stop processing. Next, when the passing time of the sheet of paper has exceeded the second threshold value that is larger than the first threshold value, the image forming apparatus 100 executes the stop processing.

As another example, the sensor 104 includes a device sensor for detecting that a device in the image forming apparatus 100 is disposed at a predetermined position. The device sensor detects that a certain mechanism of the image forming apparatus, such as a pressure-welding/separating mechanism for a transfer belt, is disposed at a predetermined position. In a case where the device sensor does not detect a state of the mechanism within a predetermined time period, there is a possibility that the mechanism may be damaged. Therefore, in a case where the device sensor does not detect a state of the mechanism within the predetermined time period, the image forming apparatus 100 locks down the stop processing in the cache memory 130.

As still another example, the sensor 104 detects, as a status value, a time period during which the image forming apparatus 100 is unstable. As an example, the sensor 104 detects a time period during which a transport speed of transporting a sheet of paper by the motor does not fall within a target range (hereinafter also referred to as "unstable time period"). In a case where the unstable time period is longer than a predetermined time period, there is a possibility that the sheet of paper is causing the image forming apparatus 100 to get out of order for some reason or other. In this case, the image forming apparatus 100 executes the stop processing. More specifically, when the unstable time period has exceeded the first threshold value, the image forming apparatus 100 writes the control program for executing the stop processing to the cache memory 130, and then locks down the stop processing. Next, when the unstable time period has exceeded the second threshold value that is larger than the first threshold value, the image forming apparatus 100 executes the stop processing.

As a further example, the sensor 104 detects, as a status value, the processing time (the operating time) of each control in the image forming apparatus 100. In a case where the processing time does not end within a predetermined time period, there is a possibility that the image forming apparatus 100 may be in a state of being incapable of ending the processing. In this case, the image forming apparatus 100 compulsorily ends the processing, and executes the stop control.

As still a further example, the sensor 104 detects, as a status value, the number of sheets printed until now by the image forming apparatus 100. The image forming apparatus 100 executes stabilization processing for maintaining the print quality according to the number of sheets printed. As the stabilization processing, there can be mentioned, for example, cleaning processing in the apparatus, adjustment processing of adjusting control parameters at the time of image forming, and the like.

When the number of sheets printed has exceeded the first threshold value, the image forming apparatus 100 writes a control program for executing the stabilization processing to the cache memory 130, and then locks down the stabilization processing. Next, when the number of sheets printed has exceeded the second threshold value that is larger than the first threshold value, the image forming apparatus 100 executes the stabilization processing.

As yet another example, the sensor 104 measures, as a status value, an execution interval between a series of print processing. In a case where the execution interval becomes a predetermined time period or longer, the image forming apparatus 100 executes the stabilization processing for maintaining the print quality. As the stabilization processing, there can be mentioned, for example, processing of preventing a toner from adhering, processing of preventing a shape of a rubber part from deforming, processing of suppressing the occurrence of a creep of the transfer belt, and the like.

As yet still another example, the sensor 104 measures, as a status value, an environment value representing an environmental state in the image forming apparatus 100. The sensor 104 as a temperature sensor detects, as an environment value, a temperature inside the image forming apparatus 100. The sensor 104 as a humidity sensor detects, as an environment value, a humidity inside the image forming apparatus 100. In a case where it is determined that the detected environment value is abnormal, the image forming apparatus 100 executes the stabilization processing for maintaining the print quality. As the stabilization processing, there can be mentioned, for example, correction processing of correcting a charge voltage, determination processing of determining a transfer voltage (Active Transfer Voltage Control (ATVC)), processing of correcting control parameters for image forming, and the like.

More specifically, when the environment value has exceeded the first threshold value, the image forming apparatus 100 writes the control program for executing the stabilization processing to the cache memory 130, and then locks down the stabilization processing. Next, when the environment value has exceeded the second threshold value that is larger than the first threshold value, the image forming apparatus 100 executes the stabilization processing.

Alternatively, when a variation value of time environment value that has varied from the time of executing the stabilization processing last time has exceeded the first threshold value, the image forming apparatus 100 writes the control program for executing the stabilization processing to the cache memory 130, and then locks down the stabilization processing. Subsequently, when the variation value has exceeded the second threshold value that is larger than the first threshold value, the image forming apparatus 100 executes the stabilization processing.

[Summary]

As described above, the image forming apparatus 100 writes, to the cache memory 130, a control program that is an execution candidate selected from among the plurality of control programs 123 stored in the HDD 120 beforehand. Next, the image forming apparatus 100 determines execution priorities of respective control programs that are execution candidates. Subsequently, the image forming apparatus 100 locks down, in the cache memory 130, a control program having a relatively high execution priority among the control programs that are the execution candidates. The control program having a higher execution priority is locked down with higher priority than those of the other control programs. Consequently, the image forming apparatus 100 is capable of preventing the control program having a high possibility of being executed from being cached out. As the result, the image forming apparatus 100 is capable of preventing the execution of such a high-priority control program that requires real-time performance from being delayed.

Although embodiments of the present invention have been described and illustrated in detail, the disclosed embodiments are made for purposes of illustration and example only and not limitation. The scope of the present invention should be interpreted by terms of the appended claims. The scope of the present invention is intended to include all modifications within the meaning and range equivalent to the scope of the claims.

What is claimed is:

1. An image forming apparatus comprising:
a storage that stores a plurality of control programs of the image forming apparatus;
a cache memory; and
a hardware processor that controls the image forming apparatus,
wherein the hardware processor:
writes, to the cache memory, one or more of the plurality of control programs that are execution candidates selected from among the plurality of control programs;
determines execution priorities of the respective control programs that are the execution candidates based on a current state of the image forming apparatus; and
locks down one of the control programs, so as to prevent the one control program from being written over by another control program, the priority of which is highest among the control programs that are the execution candidates, in the cache memory.

2. The image forming apparatus according to claim 1, wherein
every time a state of the image forming apparatus changes, the hardware processor determines the priority on the basis of a state after the change.

3. The image forming apparatus according to claim 1, wherein
on the basis of a current state of the image forming apparatus, the hardware processor estimates, as the execution candidate, a control program having a high possibility of being executed next after the current state.

4. The image forming apparatus according to claim 3, wherein
the storage further stores control information that prescribes, for each state of the image forming apparatus, a control program having a high possibility of being executed next after the current state, and
the hardware processor estimates, as the execution candidate, a control program that is associated with a current state of the image forming apparatus among the control programs prescribed in the control information.

5. The image forming apparatus according to claim 1, wherein
in a case where a data size of the control program to be locked down is smaller than a lock-down possible capacity, the hardware processor locks down the control program to be locked down in the cache memory.

6. The image forming apparatus according to claim 1, wherein
in a case where a data size of the control program to be locked down is larger than a lock-down possible capacity, the hardware processor disables the lockdown in the cache memory in order of increasing priority of the control program, and thereby reserves a capacity for locking down the control program to be locked down in the cache memory.

7. The image forming apparatus according to claim 1, comprising a hardware processor that detects a status value related to the image forming apparatus, wherein
when the status value has exceeded a predetermined value, the hardware processor writes a predetermined control program to the cache memory and
locks down the predetermined control program in the cache memory.

8. The image forming apparatus according to claim 7, wherein
the hardware processor increases an execution priority of the predetermined control program with the increase in the status value.

9. The image forming apparatus according to claim 7, wherein
the hardware processor detects, as the status value, a time taken when a sheet of paper passes through a predetermined position of a transport path of the image forming apparatus.

10. The image forming apparatus according to claim 7, wherein
the hardware processor detects, as the status value, a number of sheets printed in the image forming apparatus.

11. The image forming apparatus according to claim 7, wherein
the hardware processor detects, as the status value, an environment value representing an environmental state in the image forming apparatus.

12. The image forming apparatus according to claim 1, wherein when capacity of the cache memory is insufficient when newly writing a program in the cache memory, other programs than the one program that is locked down in order to prevent overwriting are released from the cache memory.

13. The image forming apparatus according to claim 1, wherein the cache memory includes:
a writing area that consists of a cache lockdown area which prohibits writing on a written control program even when a capacity is insufficient, and
other areas which permit overwriting on a written control program if capacity of the cache memory is insufficient.

14. A memory management method in an image forming apparatus, the memory management method comprising:
preparing a plurality of control programs of the image forming apparatus;
writing, to a cache memory, a plurality of control programs that are execution candidates selected from among the plurality of control programs;
determining execution priorities of the respective control programs that are the execution candidates based on a current state of the image forming apparatus; and
locking down, as an object to be locked down, one of the control programs, the priority of which is highest among the control programs that are the execution candidates, in the cache memory.

15. A non-transitory recording medium storing a computer readable memory management program causing an image forming apparatus to perform:
preparing a plurality of control programs of the image forming apparatus;
writing, to a cache memory, a plurality of control programs that are execution candidates selected from among the plurality of control programs;
determining execution priorities of the respective control programs that are the execution candidates based on a current state of the image forming apparatus; and
locking down, as an object to be locked down, one of the control programs, the priority of which is highest among the control programs that are the execution candidates, in the cache memory.

* * * * *